Sept. 16, 1941.  C. M. KENDRICK  2,255,785
FLUID PRESSURE DEVICE
Filed Sept. 6, 1940  5 Sheets-Sheet 1

INVENTOR
Charles M. Kendrick
BY
ATTORNEYS

Sept. 16, 1941.  C. M. KENDRICK  2,255,785
FLUID PRESSURE DEVICE
Filed Sept. 6, 1940  5 Sheets-Sheet 2

INVENTOR
Charles M. Kendrick
BY
Bartlett Eyre Keel & Weymouth
ATTORNEYS

Sept. 16, 1941.  C. M. KENDRICK  2,255,785
FLUID PRESSURE DEVICE
Filed Sept. 6, 1940  5 Sheets-Sheet 4

INVENTOR.
Charles M. Kendrick
BY
Bartlett Eyre Keel & Weymouth
ATTORNEYS

Sept. 16, 1941.  C. M. KENDRICK  2,255,785
FLUID PRESSURE DEVICE
Filed Sept. 6, 1940  5 Sheets-Sheet 5

INVENTOR
*Charles M. Kendrick*
BY
*Bartlett Eyre Keel & Weymouth*
ATTORNEYS

Patented Sept. 16, 1941

2,255,785

UNITED STATES PATENT OFFICE 2,255,785

FLUID PRESSURE DEVICE

Charles M. Kendrick, New York, N. Y., assignor to Manly Corporation, Washington, D. C., a corporation of Delaware Application September 6, 1940, Serial No. 355,546

27 Claims. (Cl. 103—136)

This invention relates to vane type fluid pressure devices such as pumps and motors and is concerned more particularly with devices of this sort in which the rotor is provided with a plurality of vanes arranged to move inwardly and outwardly thereof during operation of the device.

Fluid pumps and motors of this general class find their widest use at present as hydraulic devices, that is, devices for handling or whose motive fluid is a liquid, such, for example, as oil, and the fluid pressure device of the present invention will be described in connection with such use. It will be understood, however, that certain features of the invention are also applicable to fluid pressure devices operating with elastic fluids.

One object of this invention is to provide an improved rotary vane type fluid pressure device of this class suitable for use as a pump and capable of dependable and efficient operation under operating conditions in which present vane type pumps either will not operate satisfactorily or operate less efficiently than a pump of the present invention, or both. Another object is to provide a pump of this character that provides satisfactory operation not only at the relatively high rotative speeds at which present vane type pumps must be operated but also at slow speeds at which present vane type pumps do not function satisfactorily. Another object is to provide a pump of this class that operates dependably and satisfactorily at both slow and high speeds and also provides dependable and satisfactory operation at substantially all ambient temperatures normally encountered, with high efficiency and little wear of the vanes and vane track under all conditions of its use.

Another object is to provide an improved fluid pressure device, such as a pump or a motor, in which the efficiency is further increased and friction and wear of the vanes and vane track still further reduced in the portion of the rotary travel of the vanes intermediate the inlet and outlet areas, together with simple and efficient means for accomplishing this end.

Other and more specific objects will hereinafter appear.

The invention will be understood from consideration of the accompanying drawings which illustrate, by way of example, the invention embodied in a pump of constant capacity. It will also be understood, however, that the invention is likewise applicable to pumps of variable capacity and that certain features, as will be later pointed out, are also applicable to vane type fluid motors of either constant or variable capacity.

Figure 1:
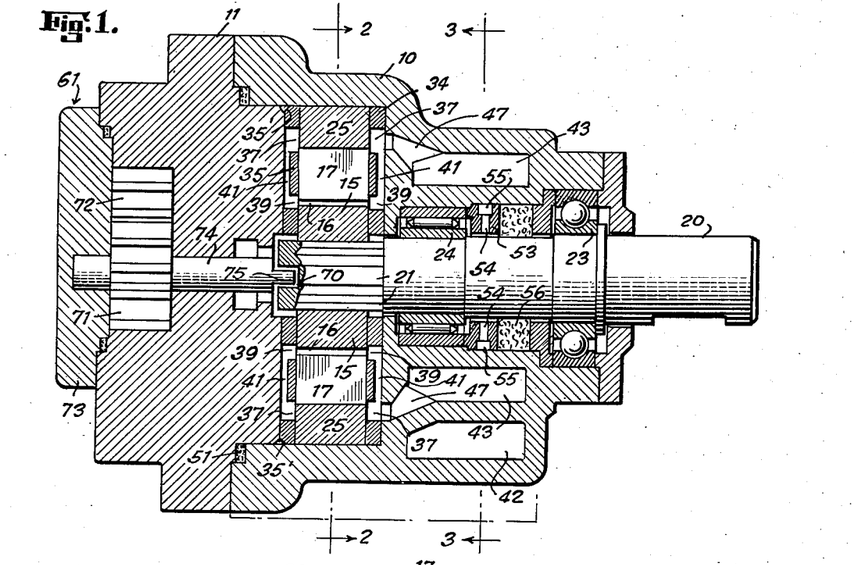
Fig. 1 is a longitudinal sectional view taken along the line 1—1 of Fig. 2 and showing a constant capacity vane type pump constructed according to the present invention.
Figure 2:
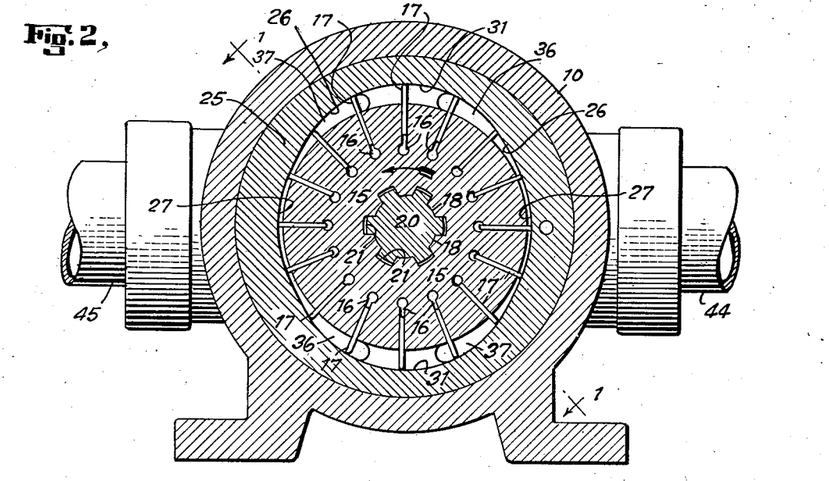
Fig. 2 is a view in vertical transverse section taken along the line 2—2 of Fig. 1.
Figure 8:
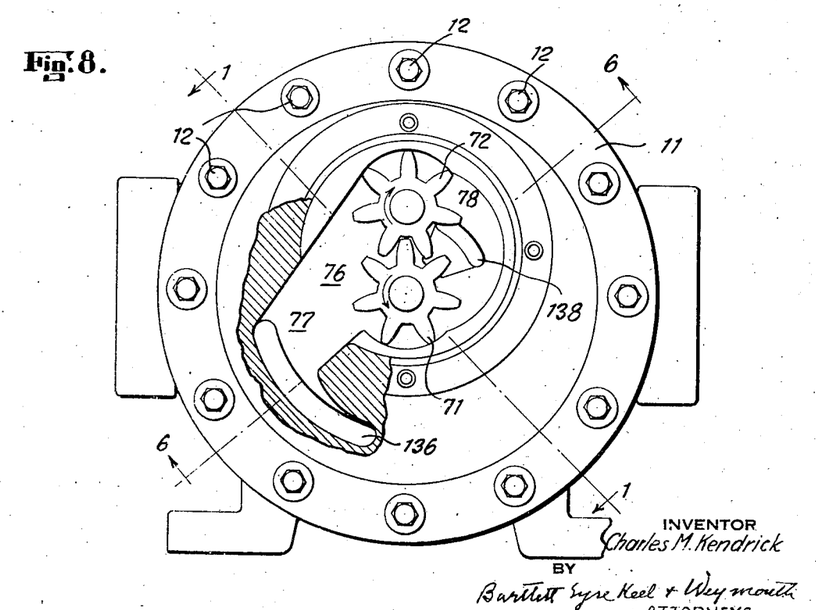
Fig. 8 is an outer elevation of the end head or cover in place on the pump but partially broken away to show certain of the fluid passages and with the cover of the auxiliary pump removed.

Referring now to the drawings, the pump includes a casing 10 formed with an open-ended cavity for the rotor 15 and associated parts as shown in Figs. 1 and 2. The rotor cavity is closed (Fig. 1) by an end head or cover member 11 which is attached to the casing 10 as by cap screws 12 (Fig. 8). The rotor 15 is provided with a plurality of vanes 17 which are movable in a substantially radial direction inward and outward in the vane slots 16 (Figs. 1 and 2). A vane track ring 25 surrounds the rotor and vane assembly and its inner circumferential surface 26 (Fig. 2) forms a track adapted to contact the radially outer ends of the vanes 17 as the rotor revolves and to guide and control the vanes in their inward and outward movement; the surface 26 will hereinafter be referred to as the "vane track."

The rotor 15 and shaft 20 may be mounted and the two parts may be operatively connected with each other in any appropriate manner. In the present instance the rotor 15, shaft 20, their mountings and the operative connections there-between are the same as disclosed in my co-pending application filed December 8, 1939, Serial Number 307,755. As shown in Fig. 1, the shaft 20 is revolubly supported by a pair of bearing elements 23 and 24 carried by the casing 10 and the rotor 15 is mounted on the end of the shaft 20 which projects into the rotor cavity. For this purpose the end of the shaft 20 is formed with axially extending splines 21 (Figs. 1 and 2) and the rotor 15 is formed in its central opening with mating splines 18 (Fig. 2). The arrangement is such that the rotor 15 is freely movable in an axial direction on the shaft splines 21 while permitting a limited angular or rocking motion of the rotor 15 relative to the shaft 20 in such manner that the cheek plates 34 and 35, to be presently described, determine the axial and angular position of the rotor on the shaft and the plane of rotation of the rotor as fully explained in co-pending application Serial Number 307,755 above mentioned.

The rotor 15 is hydraulically balanced with respect to all forces imposed thereon by fluid pressure. Hydraulic balance of forces acting on the rotor in a radial direction is obtained by dividing the space intermediate the periphery of the rotor 15 and the vane track 26 into two equal and oppositely positioned fluid sections, each fluid section comprising a pumping or working chamber flanked by an inlet area and an outlet area. As shown in Fig. 2, the division between the two fluid sections is effected by co-operation of the rotor 15 and the outer ends of the vanes 17 with the vane track 26 at the regions of the vane track's least diameter which in the present embodiment is adjacent the horizontal centerline. The vane track 26 is preferably provided at each of these points of division with an arc 27, for convenience termed the "sealing arc," substantially concentric with the rotor 15 and extending in a circumferential direction for a distance equal to at least the angular distance between a pair of adjacent vanes 17.

The pumping or working chambers of the two fluid sections are formed by means of two diametrically positioned arcs 31 (Fig. 2), preferably concentric with the rotor 15 and termed the "pumping arcs" or "working arcs," which are located in the regions of greatest diameter of the vane track 26. Each working chamber extends in a circumferential direction for an arcuate distance substantially equal to the distance between the outer ends of two adjacent vanes 17 which at any given instant are moving in contact with the corresponding working arc 31. Fluid is admitted between the vanes as they move through the inlet areas toward the working chambers and fluid is discharged as the vanes recede therefrom through the outlet areas of the two fluid sections. The inlet area of each fluid section is thus at all times separated from the outlet area of that fluid section by at least one of the vanes 17. The portions of the vane track 26 intermediate the sealing arcs 27 and working arcs 31 may be given any suitable curvature producing satisfactory rates of inward and outward movement of the vanes 17 as the rotor 15 revolves.

The sides or axial ends of the working chambers are closed by a pair of mating disc-shaped members 34 and 35 (Figs. 1, 2, 4 and 5), for convenience termed "end plates" or "cheek plates," which are provided with holes at their centers for the shaft 20. The outer surfaces of the cheek plates 34 and 35 fit snugly against the wall surfaces of the casing 10 and end head 11 respectively and form substantially fluid tight fits with the several ports and passages to be presently described. The inner or opposing faces of the cheek plates 34 and 35 form fluid tight fits with the sides of the vane track ring 25 by which they are axially positioned with respect to the rotor 15 in such manner that the rotor is permitted to turn freely while its sides and the sides of the vanes 17 form substantially fluid tight running fits with the adjacent faces of the cheek plates 34 and 35. The cheek plates 34 will hereinafter be termed the "casing cheek plate" and the cheek plate 35 will be termed the "end head cheek plate."

Figure 4:
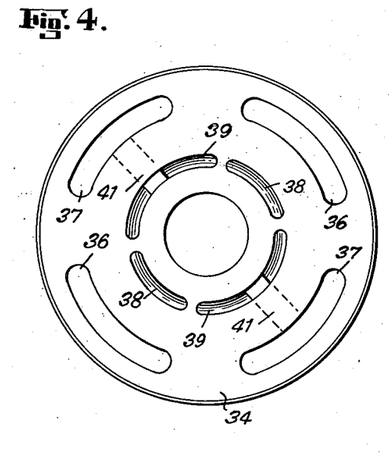
Figs. 4 and 5 show an inner elevation of each of two members, for convenience termed "end plates" or "cheek plates"
Figure 5:
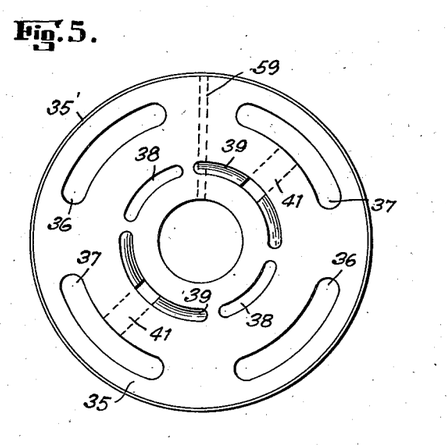

The cheek plates 34 and 35 are provided with coextensive mating ports (Figs. 1, 4 and 5), the ports of one cheek plate being axially opposite the ports of the other cheek plate when the parts are in position in the casing 10 so that all forces exerted upon the rotor 15 and vanes 17 in an axial direction by fluid pressure are thus completely balanced. The ports in the cheek plates 34 and 35 will be best understood from Figs. 4 and 5 which show an inner elevation of the rotor face of the casing cheek plate 34 and of the end head cheek plate 35 respectively. Referring to Figs. 4 and 5, each cheek plate is provided with a pair of diametrically opposed arcuate inlet slots or ports 36 and a similar pair of diametrically opposed outlet slots or ports 37. The ports 36 and 37 of the casing cheek plate 34 are also partially shown in Fig. 2 and the ports 37 are also shown in the sectional view of Fig. 1. Fluid is admitted to the outer ends of the vanes through the pair of inlet ports 36 in the casing cheek plate 34, and similarly, fluid discharged or exhausted by the outer ends of said vanes passes out through the pair of outlet ports 37 of the same cheek plate. The ports 36 and 37 of the end head cheek plate 35 function principally as "balance ports" to contain fluid under the same pressure as that in the corresponding ports of the casing cheek plate 34 in order to produce hydraulic balance of the rotating parts, as already stated.

The portion of the fluid circuit for conveying fluid to and from the outer ends of the vanes 17 also includes a pair of branched channels 42 and 43 respectively (Figs. 1 and 3) which are formed in the casing 10 and which are similar to the fluid channels shown in application Serial Number 307,755. The fluid channel 43 is connected with the outlet fluid conduit 45 and with the ports 37 of the casing cheek plate 34 by slanted passages 47 (Fig. 1). The fluid channel 42 is similarly connected with the fluid inlet conduit 44 and is also connected with the two ports 36 of the casing cheek plate 34 as by slanted passages 46 (Fig. 3) similar to the slanted passages 47 shown in Fig. 1.

With the arrangement hereinbefore described and with the parts in the positions shown in Fig. 2, upon rotation of the rotor 15 in a counter-clockwise direction the outer ends of the vanes 17 moving across the working arcs 31 will pump fluid from the fluid inlet areas connected with the inlet ports 36 to the fluid outlet areas connected with the outlet ports 37. In order for this pumping to take place, however, it is necessary that the vanes 17 move radially outward as they pass from the sealing arcs 27 and through the inlet areas in order that the outer ends of said vanes 17 may be in contact with the vane track as they pass on to the working arcs 31, and for quiet and smooth operation it is practically essential that contact between the outer ends of said vanes 17 and the vane track be continuously maintained during this portion of their rotary travel. The two methods of providing this radially outward movement and track-following action of the vanes 17 which have heretofore been generally employed are what may for convenience be termed the "centrifugal force method" and the "full pressure method."

According to the centrifugal force method, centrifugal force alone is employed to move the vanes radially outward as they pass through the inlet areas and the contour of the vane track 26 intermediate the sealing arcs 27 and working arcs 31 is made such that the centrifugal force available to move the vanes radially outward is sufficient to keep their outer ends in contact with the vane track during this portion of their rotary travel. This is the preferred method where operating conditions permit its use and has numerous advantages, such, for example, as high efficiency, little or no wear of the portion of the vane track in the inlet areas, maximum pump output (because fluid is pumped by both the inner and outer ends of the vanes as fully explained in co-pending application filed May 5, 1939, Serial Number 271,874) and non-pulsating delivery. But the centrifugal force method also has numerous limitations and there are many instances in which it cannot be used with satisfaction. For example, the centrifugal force method requires relatively high speeds of the rotor and cannot be used with low rotative speeds. The centrifugal force method also limits the permissible variation in the contour of the vane track 26 intermediate the sealing arcs 27 and working arcs 31 (the contour of this portion of the vane track is preferably a segment of a parabola) because the contour must be such that the vanes, under influence of centrifugal force alone, move radially outward rapidly enough to follow the vane track and maintain contact therewith during this portion of their rotary travel; a contour meeting this requirement cannot always be provided as, for instance, in certain types of adjustable vane tracks for variable capacity vane pumps in which the track shape at some points of its adjustment is such that centrifugal force alone is unable to maintain contact between the vanes and vane track, as, for example, in some forms of the adjustable vane tracks of the variable capacity vane pump illustrated in co-pending application Serial Number 263,649. The centrifugal force method also limits the maximum "stroke" or distance of radial movement of the vanes (i. e. the difference in radii of the working arcs 31 and sealing arcs 27), as it will be clear that the stroke can be no greater or longer than the maximum radially outward distance through which centrifugal force can move the vanes during the portion of its rotary travel intermediate the sealing arcs 27 and the working arcs 31; in this connection it should be kept in mind that only a part of the total centrifugal force is available to move the vanes radially outward as part of it must be used to overcome friction, to shear the oil film, etc.; there are many instances where it is desirable to employ a stroke longer than the maximum stroke usable with this method. Another consideration is the ambient temperature and its effect on the viscosity of the circulated fluid, which is usually oil; increase in viscosity due to low ambient temperatures increases the force required to shear the oil film, thus reducing the portion of the total centrifugal force available for moving the vanes radially outward, with the result that pumps employing the centrifugal force method frequently fail to operate or operate unsatisfactorily upon a drop in the ambient temperature, although such pumps may operate with entire satisfaction at higher temperatures such as room temperature, etc. The latter consideration makes pumps employing the centrifugal force method unsuitable for use as portable or outdoor equipment subject to wide variation of ambient temperatures, for example, as part of an automotive vehicle which must operate throughout a wide range of temperatures. It is thus seen that while the centrifugal force method is preferred where it gives satisfactory operation, its use is limited and there are many instances in which it is not satisfactory.

According to the second or full pressure method, operating pressure fluid from the outlet area of the pump, or the equivalent thereof, is continuously supplied to the inner ends of all the vanes and acts to force the vanes radially outward during the time that the outer ends of the vanes are passing through the inlet areas. This method overcomes some of the above-mentioned limitations of the centrifugal force method but retains a number of them, such, for example, as inability to operate satisfactorily and dependably at slow speeds or at greatly increased viscosity of the fluid at low ambient temperatures. In addition, the full pressure method has other disadvantages. Among these disadvantages is that the output of a pump employing the full pressure method is less than the output of a pump employing the centrifugal force method; this decrease, which is often as much as 10%, is equal to the space occupied by the outer ends of the vanes in their extreme outward position and is due to the fact that no fluid is pumped by the inner ends of the vanes. Coupled with this decreased delivery is a pulsation of flow, as contrasted with the non-pulsating flow from a pump employing the centrifugal force method, this pulsation being likewise due to the space occupied by the outer ends of the vanes and to the fact that no fluid is pumped by the inner ends thereof. The greatest weakness or disadvantage of the full pressure method is, however, that it adds materially to the friction and wear of the vanes and vane track as the vanes pass through the inlet areas, thus adversely affecting the efficiency and life of the pump. This is because of the great difference that usually exists in pressures of the fluid on the inner and outer ends of the vanes as they pass through the inlet areas, that is to say, the difference between the pressure of the operating pressure fluid from the outlet areas admitted to the inner ends of the vanes and the pressure of the fluid in the inlet area to which the outer ends of said vanes are exposed while passing therethrough. The pressure of the operating pressure fluid is usually high and frequently as much as 1000 lbs. per sq. in. whereas the pressure of the fluid in the inlet areas is always low and is frequently less than atmospheric. Friction between the vanes and vane track in the inlet areas is thus unnecessarily increased and the efficiency of the pump correspondingly reduced. Of sometimes even greater importance than the efficiency, however, is the greatly increased wear on the outer ends of the vanes and on the vane track resulting from this added friction; in a pump employing the full pressure method, maximum wear on the vane track takes place on the portion thereof lying in the inlet areas. In fact, wear of the vane track surface in the inlet areas of a pump employing the full pressure method is usually the limiting factor in the period of its usefulness and correspondingly shortens the life of the pump. A still further limitation or disadvantage of the full pressure method is that it cannot be used with relatively high working pressures (such, for example, as 1000 lbs. per sq. in.) in variable capacity vane type pumps having spring type vane tracks such, for example, as the vane tracks illustrated in Patents Nos. 2,141,170, and 2,141,171 and in co-pending application Serial No. 366,931, filed November 23, 1940, which is in part a continuation of application Serial No. 247,586, filed December 24, 1938; this is because the force exerted by the operating pressure fluid on the inner ends of the vanes causes the vanes to distort the shape of the spring track member in the inlet area and not only alters its contour but is also likely to produce unevenness at the joints of the several parts comprising the vane track.

The present invention provides novel, simple and improved means for overcoming all of the above mentioned defects, thus providing a pump that operates satisfactorily and dependably under all operating conditions. These means will now be described.

Referring to Figs. 1, 4 and 5, each of the cheek plates 34 and 35 is also provided with two pairs of mating arcuate vane slot ports 38 and 39 which are positioned to register successively with the inner ends of the vane slots 16 as the rotor revolves. The vane slot ports 38 are adapted to register with the inner ends of the vane slots 16 during the time that the outer end of the corresponding vanes 17 in said slots are passing through the inlet areas connected with the inlet ports 36. The vane slot ports 38 of the end head cheek plate 35 extend through said cheek plate 35 and register with similar ports 138 in the end head 11, as will be presently explained; the vane slot ports 38 of the casing cheek plate 34 may likewise extend through said cheek plate 34, or as shown in Fig. 4, may be merely recessed in the face of said cheek plate adjacent the rotor 15. Fluid is supplied to the inner ends of the vanes 17 through the vane slot ports 38 of the end head cheek plate 35 and the supply of fluid in the vane slot ports 38 of the casing cheek plate 34 passes thereto from the vane slot ports 38 of the end head cheek plate 35 through the inner ends of the vane slots 16. The vane slot ports 39 of the cheek plates 34 and 35 are merely recessed in the faces thereof adjacent the rotor 15 and are of such length that they connect with the inner ends of the vane slots 16 during the time that the outer ends of the corresponding vanes 17 are traversing the working arcs 31, the outlet areas connected with the outlet ports 36 and the sealing arcs 27, or in other words, the vane slot ports 39 connect with the inner ends of the vane slots 16 during substantially all of the rotary travel of the vanes and vane slots except the portion of said rotary travel in which said vane slots are connected with the vane slot ports 38. The vane slot ports 39 of both cheek plates 34 and 35 are connected with the corresponding outlet ports 37 by radial grooves or passages 41 as shown in dotted lines in Figs. 4 and 5 and as also shown in the sectional view of Fig. 1; the pressure of the fluid in said vane slot ports 39 is therefore the same as the pressure in the outlet ports 37, thus providing hydraulic balance of the hydraulic forces acting radially on the vanes 17 as they pass through the outlet areas and also subjecting the inner ends of the vanes to the pressure of the working fluid as said vanes traverse the working arcs 31 and sealing arcs 27 to hold the outer ends of the vanes 17 firmly in contact with the vane track at said working and sealing arcs.

Figures 9, 9A, 10:
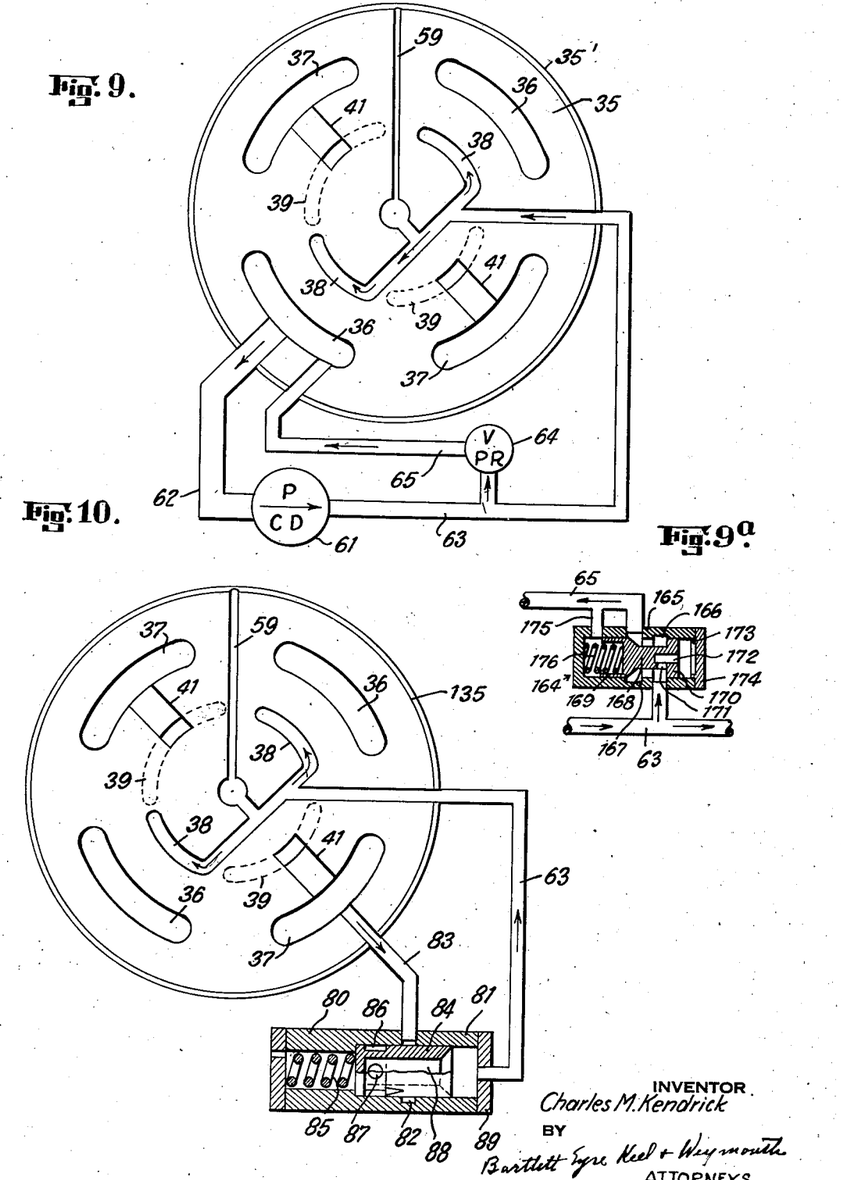
Fig. 9 illustrates the arrangement of Figs. 1–8 in somewhat schematic form.
Fig. 9a illustrates a modified form of valve mechanism which may be substituted for the relief valve of Fig. 9.
Fig. 10 illustrates, partly in section and partly in diagrammatic arrangement, an alternative embodiment of certain features of the invention.

As shown schematically in Fig. 9, there is provided a small auxiliary pump 61 receiving its supply of fluid through a suitable inlet connection 62, here shown as leading from one of the inlet ports 36 of the end head cheek plate 35, said end head cheek plate 35 being shown in Fig. 9 as viewed from the outer face thereof. Fluid delivered by the auxiliary pump 61 passes into a discharge conduit 63 leading to and connecting with the two inlet vane slot ports 38 of the end head cheek plate 35. The auxiliary pump 61 is made of such size that its output exceeds (preferably by a very small amount) the volume of fluid required to fill the inner ends of the vane slots 16 that successively come into register with the vane slot ports 38 as the vanes 17 in said slots move radially outward while passing through the inlet areas of the vane pump. The pressure of the fluid delivered by the auxiliary pump 61 is regulated by a relief valve 64 through which excess fluid is exhausted and passes through a passage 65 either to the tank, or as in the present instance, back to the inlet portion of the vane pump's fluid circuit, here shown as a return connection to one of the inlet ports 36 of the end head cheek plate 35. The relief valve 64 is adapted to maintain a substantially constant but relatively low pressure in the discharge conduit 63 so that fluid supplied to the vane slot ports 38 is under pressure sufficient to move the vanes radially outward and maintain the necessary track-following action thereof but is not materially in excess of the pressure required for this purpose. In practice it has been found that a pressure of from 20 to 30 lbs. per sq. in. or less is usually sufficient to produce satisfactory track-following action of the vanes and smooth, dependable operation of the vane pump, and excellent results have been obtained with this arrangement when utilizing pressures within this range.

Figure 6:
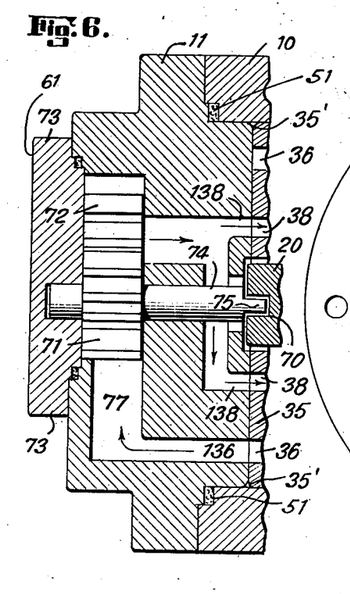
Fig. 6 is a fragmentary longitudinal sectional view along the line 6—6 of Fig. 8, showing the method of driving an auxiliary pump and also showing certain of the fluid passages.
Figure 7:
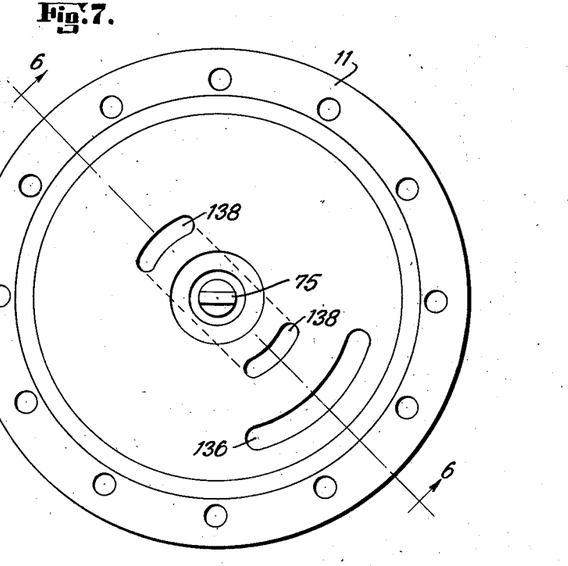
Fig. 7 is an inner elevation of the end head or cover.

Figs. 1, 6, 7 and 8 illustrate a preferrred embodiment of the arrangement schematically shown in Fig. 9. The end head 11 forms the housing for the auxiliary pump which is here shown as a pump of the spur gear type comprising a driving gear 71 and an "idler" gear 72 as shown in Figs. 1, 6 and 8. The shafts of the gears 71 and 72 are supported in appropriate bores formed in the end head 11 and in the auxiliary pump cover 73, as will be understood from Fig. 6 which shows the shaft 74 and support for the driving gear 71. The shaft 74 of the driving gear 71 extends inward for connection with the shaft 20 (Figs. 1 and 6) to be driven thereby and with which it is operatively connected by a tongue or flat reduced portion 75 that enters the transverse slot 70 on the end of said shaft.

Fluid is supplied to the inlet area 76 (Fig. 8) of the auxiliary pump through a cored passage 77 leading thereto from the arcuate port 136 (Figs. 6, 7 and 8) formed in the wall surface of the end head 11, the port 136 being adapted to register and connect with the corresponding inlet port 36 of the end head cheek plate 35. Pressure fluid delivered by the auxiliary pump passes into its outlet area 78 (Figs. 6 and 8) which branches to connect with the two arcuate ports 138 (Figs. 6, 7 and 8) in the wall surface of the end head 11, said ports 138 registering with the vane slot ports 38 of the end head cheek plate 35 as already explained.

Figure 3:
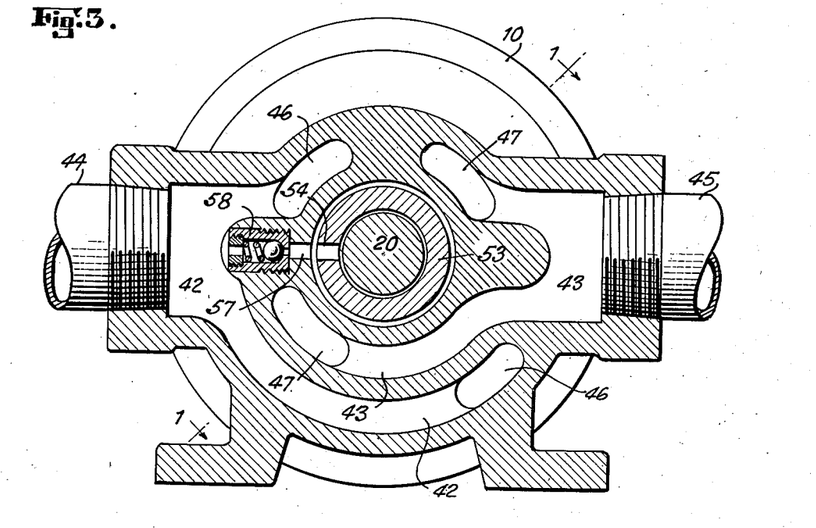
Fig. 3 is also a vertical transverse view taken along the line 3—3 of Fig. 1, looking in a direction opposite to that of Fig. 2.

Excess fluid delivered by the auxiliary pump and not required by the inner ends of the vanes 17 is returned, through a relief or differential pressure valve, to the inlet conduit 42 in the casing 10. The path of flow of this excess fluid is as follows: through the clearance hole (Figs. 1, 6 and 7) surrounding the driving gear's shaft 74, into the hole at the center of the end head cheek plate 35, axially through the rotor 15 in the spaces between the rotor splines 18 and the shaft splines 21, through the hole at the center of the casing cheek plate 34, axially through the central bore of the casing 10, through the bearing member 24 and into the space between the shaft 20 and the annular spacer member 53 until it reaches the shaft packing 56. The shaft packing 56 prevents or resists further axial travel of the fluid and it is forced through the radial holes 54 (Figs. 1 and 3) in the annular spacer member 53 and into the outer annular groove 55 thereon which connects with a passage 57 formed in the casing 10 and leading from the central bore of said casing 10 to the inlet conduit 42 as shown in Fig. 3. A relief or differential pressure valve 58 positioned intermediate the ends of the passage 57 regulates the escape or flow of fluid into the inlet conduit and maintains on the inlet side of said valve 58 a pressure that exceeds by a substantially constant amount the pressure existing in said inlet conduit. In most instances the pressure in the inlet conduit is relatively low and substantially constant, in which case the pressure maintained on the inlet side of the valve 58 will also be relatively constant, but in the event of any change in pressure of the fluid in the inlet conduit 42, the pressure maintained by the valve 58 on its inlet side will be correspondingly increased.

In this manner the pressure of the fluid admitted to and acting on the inner ends of the vanes 17 during intake always exceeds by a substantially constant predetermined amount the pressure admitted to and acting on the outer ends of said vanes 17 as they pass through the fluid inlet areas connected with the inlet ports 36, thus providing a substantially constant auxiliary force that urges the vanes radially outward and maintains the outer ends thereof in contact with the vane track during this portion of their rotary travel. This auxiliary force is independent of centrifugal force, although in the present embodiment it acts in the same direction and supplementary thereto; it is likewise independent of the speed of rotation and provides equally satisfactory vane action at low rotative speeds as well as at high speeds; it is further independent of the pressure existing in the outlet areas of the vane pump and acts on the vanes during only the portion of their rotary travel in which they must move radially outward, that is to say, during the time that the outer ends of the vanes are passing through the inlet areas connected with the inlet ports 36. The valve 58 has, for convenience in illustration, been shown as a simple ball type relief valve, and this will answer the purpose in most instances, but it is to be understood that any other suitable type of valve may be used, such, for example, as the differential pressure valve 164 shown in Fig. 9a and to be presently described.

This method of supplying to the inner ends of the vanes during intake fluid under regulated pressure higher than the pressure of the fluid to which the outer ends of the vanes are exposed in the inlet areas, preferably from an auxiliary pump (hereinafter termed the "present method") has numerous other advantages. For example, it retains substantially all of the advantages of both the full pressure and centrifugal force methods and also overcomes all of their disadvantages. As above stated, it provides reliable, smooth and satisfactory operation of the vane pump at low rotative speeds as well as at high speeds. It provides satisfactory operation at substantially all ambient temperatures encountered in either outdoor use or ordinary indoor use, this being assured by merely establishing the predetermined pressure of fluid to be supplied to the inner ends of the vanes during intake at a value sufficient to provide satisfactory vane action when the viscosity of the circulated fluid is maximum. The delivery of a pump employing the present method is greater than that of a corresponding pump employing the full pressure method and is as great and equally non-pulsating as when the centrifugal force method is employed. The present method also makes it possible and practical to use larger or longer strokes of the vanes than is possible with other methods. The friction and wear of the vanes and vane track in the inlet areas is negligibly if any greater with the present method than with the centrifugal force method and is very greatly less than with the full pressure method; the great advantage of the present method over the full pressure method in this respect is readily apparent when it is considered that the pressure required to move the vanes radially outward during intake and supplied by the present method is, as has already been stated, usually from 20 lbs. to 30 lbs. per sq. in. or less, irrespective of the pressure in the vane pump's outlet areas, whereas the pressure in said vane pump's outlet areas, and hence the pressure supplied to the inner ends of the vanes in the full pressure method, will usually be much in excess of the required pressure of 20–30 lbs. and will be frequently as high as 1000 lbs. per sq. in. or more. In the foregoing explanation and illustrative examples it has been assumed that the pressure of the fluid in the inlet ports 36 is negligible, such, for example, as atmospheric pressure or less, as is frequently the case in pumps of this general character; in instances in which greater pressure exists in said inlet ports 36, however, it is merely necessary to correspondingly increase the pressure of the fluid supplied to the vane slot ports 38 so that the pressure of the fluid supplied thereby to the inner ends of the vanes is sufficiently greater than the pressure of the fluid in the inlet ports 36 to move said vanes into contact with the vane track while the outer ends thereof are passing through the inlet areas of the pump.

The present method also has a particular advantage in variable capacity vane pumps using, for example, spring type vane tracks. These spring type vane tracks are necessarily flexible to permit change of their shape upon variation of output of the pump, and therefore, as previously stated, would tend to be flexed out of their correct shape by application of full pump pressure (such as 1000 lbs. per sq. in.) to the inner ends of the vanes while the outer ends of the vanes are passing across the flexible track elements that lie in the inlet areas of the pump. With the present method the load imposed upon the flexible spring track elements in the inlet areas (which are usually the suction areas) is very small and does no harm. It is understood, therefore, that the vane track may be either the fixed non-variable track of Figs. 1 and 2 or it may be of the variable type such, for example, as spring type vane tracks illustrated in co-pending application, original Serial Number 366,931 or in United States Patents Nos. 2,141,170 and 2,141,171, or such as the link type vane tracks illustrated in co-pending application Serial Number 263,649, or of any other suitable type.

This feature of the present invention, therefore, overcomes numerous limitations that have heretofore restricted the use of vane type pumps and correspondingly increases the scope of their practical and satisfactory usefulness, and hence is highly important.

The preferred embodiment illustrated in Figs. 1, 6, 7 and 8 also has other particular advantages. For example, the auxiliary pump is driven simultaneously with the rotor 15, so that delivery of said auxiliary pump bears a substantially constant relation to the requirements of the inner ends of the vanes 17 at all speeds of operation. Another advantage is that the auxiliary pump unit is housed in the end head 11 and hence requires no pipes, etc., so that the auxiliary pump and its entire fluid circuit is fully enclosed.

The preferred embodiment illustrated in Figs. 1, 6, 7 and 8 also provides improved means for positively preventing the entry of air into the vane pump at the shaft and end head packings when the circulated fluid is a liquid, such as oil, as is usually the case. The exclusion of air from pumps of this character is absolutely essential as any air whatsoever entering the inlet areas will cause noisy and unsatisfactory operation of the pump and of the device operated by pressure fluid delivered by the pump. Co-pending application Serial Number 307,755, filed December 6, 1939, discloses means for preventing the entry of air into the pump and, according to that arrangement, this is accomplished by a liquid seal on the inner side of the packings which is provided by collecting the liquid that leads radially inward in the vane pump, conducting said leakage fluid to the inner side of the packings and permitting the escape of such collected leakage fluid under control of a relief valve which functions to maintain said collected leakage fluid under a pressure that is relatively low but greater than atmospheric pressure. The present invention goes farther than the arrangement of Serial Number 307,755 and does not depend upon the leakage fluid to provide these liquid seals but utilizes the excess of the fluid delivered by the auxiliary pump for this purpose, any leakage fluid merely supplementing such excess. The arrangement of the present invention therefore, functions even when no internal leakage occurs in the vane pump, as at very low pressures in the outlet areas thereof, and also begins to function immediately upon rotation of the rotor 15. This will be understood from the explanation already given and that which follows.

Referring to Fig. 1, when operation of the vane pump is started by rotation of the shaft 20 the rotor 15 and the gears 71 and 72 of the auxiliary pump will begin to rotate simultaneously and the auxiliary pump will begin to deliver fluid in excess of the amount required by the inner ends of the vanes 17 as the corresponding vane slots 16 move in connection with the vane slot ports 38 or during intake. Almost instantly this excess fluid will build up pressure in the auxiliary pump's outlet areas 78 and in the connected passages intermediate said outlet area 78 and the valve 58. A pressure above atmospheric is thus almost instantly built up on the inner side of the shaft packing 56 and prevents the entry of air at this point; the amount of this pressure will, of course, depend upon the particular valve 58 employed but as elsewhere stated will be relatively low and above atmospheric, probably from 20 lbs. to 30 lbs. per sq. in. or less. A radial groove 59 (Figs. 5 and 9) on the outer face of the end head cheek plate 35 connects the hole at the center of said cheek plate 35 with the chamfer 35' at the periphery of said cheek plate 35 as shown by the dotted lines in Fig. 5. Pressure fluid from the auxiliary pump is thus supplied to the small annular space formed by the chamfered edges of the casing cheek plate 35 and the wall surface of the end head 11, and will either seal out the air at this point or will pass to the end head packing 51 and there effect such seal, depending upon how tightly the end head is fitted into the bore of the rotor cavity; the pressure of this pressure fluid will, of course, be dependent upon the valve 58 and will be almost instantly built up upon starting of the pump. Fluid leaking out of the outlet areas and outlet ports 37 of the vane pump merely joins the excess fluid delivered by the auxiliary pump and is returned to the inlet conduit therewith, but it will be understood that the functioning of the liquid seals on the shaft packing 56 and end head packing 51 is not dependent upon such leakage.

As heretofore stated, in many instances a pressure relief valve will answer the requirements for regulating the pressure of the fluid supplied by the auxiliary pump 61 to the inner ends of the vanes as the outer ends thereof pass through the vane pump's inlet area. In some instances, however, it will be preferable to employ a differential pressure valve active to maintain the fluid supplied to the inner ends of the vanes at a pressure related to but exceeding by a substantially constant amount the pressure of the fluid in the vane pump's inlet area, as, for example, when the pressure of the fluid in the vane pump's inlet area is subject to variation and it is desired to keep the pressure of the fluid supplied to the inner ends of the vanes at a substantially constant amount above the pressure in said inlet area regardless of the changes in its pressure. Differential pressure valve mechanisms suitable for this use are disclosed in co-pending applications Serial Number 198,449, filed March 28, 1938, Serial Number 271,874, filed May 5, 1939 and Serial Number 336,956, filed May 24, 1940. The arrangement when a differential pressure valve is employed will be understood from Fig. 9a which illustrates a differential pressure valve 164 similar to a corresponding valve shown in Serial No. 336,956 and said differential pressure valve 164 may be substituted for the relief valve 58 of Fig. 3 or, as here shown, for the relief valve 64 of the schematic arrangement illustrated in Fig. 9.

The differential pressure valve 164 includes a housing 165 having a valve bore suitably closed at both its ends and provided with an annular inlet port 166 and an annular outlet port 167 axially spaced from the inlet port 166. The inlet port 166 is connected with the discharge conduit 63 of the auxiliary pump 61, so that the excess fluid delivered by said auxiliary pump 61 and not required to supply the requirements of the inner ends of the vanes 17 will pass into said inlet port 166. The outlet port 167 is connected with the passage 65 leading to the inlet portion of the vane pump's fluid circuit, this connection to the inlet portion of the vane pump's fluid circuit (and not to the reservoir or tank) being essential when the differential pressure valve is used.

Slidably fitted within the valve bore is a valve piston 168 having two heads 169 and 170 respectively of the same cross-sectional area and spaced from each other so that the inlet port 166 is always in communication with the reduced portion of said valve piston that separates the two heads 169 and 170. The end of the valve piston 168 adjacent the head 170 is adapted to be acted upon at all times by fluid having the same pressure as that in the inlet port 166 and is accordingly connected with said port 166 by a radial hole 171 that connects with an axial hole 172 extending through the head 170. A small shoulder 173 on the end cover 174 acts as a stop for the valve piston 168 and thus exposes substantially the full area of the end of said valve piston to the action of the pressure fluid when said valve piston is in its fully closed position at the extreme right end of the valve bore. The end of the valve piston 168 adjacent the head 169 is similarly adapted to be acted upon by fluid having the same pressure as that in the outlet port 167 and the corresponding end of the valve bore is accordingly connected with the passage 65 as by a passage 175 that enters the valve bore at a point that is not covered or closed when the valve piston 168 is in its extreme open position. The valve piston 168 is thus urged toward its fully open position by action of pressure fluid from the inlet port 166 on the end of said valve piston adjacent the head 170 and this force is opposed by action of pressure fluid from the outlet port 167 upon the opposite end of said valve piston 168 and the supplementary force exerted by a spring 176, one end of which bears against the valve piston 168 and the other end of which bears against the closed end of the valve bore.

Two oppositely acting forces are thus brought to bear on the valve piston 168 and said piston is moved until these opposing forces are balanced. This balance of forces is effected by movement of the valve piston 168 until the head partially closes the outlet port 167, thereby increasing resistance to flow therethrough and producing a pressure in the inlet port 166 that exceeds the pressure existing in the outlet port 167, so that the force exerted by the action of pressure fluid from the inlet port 166 upon the end of the valve piston adjacent the head 170 equals the combined forces exerted by action of pressure fluid from the outlet port 167 on the opposite end of the valve piston 168 and the supplementary force exerted by the spring 176. The valve piston 168 is thus moved to maintain the fluid in the inlet port 166 at a pressure exceeding the pressure existing in the outlet port 167 by an amount corresponding to the force exerted by the spring 176. The pressure in the inlet port 166 thus at all times exceeds the pressure in the outlet port 167 by a substantially constant amount determined by the spring 176 and this difference in pressures is maintained substantially constant irrespective of absolute pressures.

In this manner the differential pressure valve acts to maintain the fluid supplied to the inner ends of the vanes while the outer ends thereof are passing through the inlet area at a pressure exceeding by a substantially constant amount the pressure of the fluid in the inlet areas, and this is the case irrespective of changes in pressure of said fluid in said inlet areas. This assures satisfactory operation regardless of changes in pressure of the fluid in the inlet area of the vane pump and makes it possible to reduce to a minimum the friction and wear of the vanes and the portion of the vane track in the inlet area by establishing the pressure difference or differential to be maintained at the smallest amount producing satisfactory vane action.

The alternative arrangement schematically shown in Fig. 10 differs from the arrangement of Figs. 1-9 principally in the method for supplying and controlling the pressure of the fluid supplied to the packings and to the inner ends of the vanes during their outward or intake movement. In this instance fluid for this purpose is taken from the outlet areas of the vane pump under control of a valve 80 adapted to maintain a substantially constant but relatively low pressure in the discharge conduit 63 leading to the vane slot ports 38. The arrangement of Fig. 10 is therefore usually less preferable than that of Figs. 6-9 because among other reasons, it reduces the vane pump's output and correspondingly increases power losses but the somewhat greater simplicity of its mechanism may make it preferable in some instances.

Referring to Fig. 10, the valve 80 includes a housing 81 having in its valve bore an annular port 82 which is connected with the outlet area of the vane pump, this connection being here schematically shown as a passage 83 leading from one of the outlet ports 37 of the modified end head cheek plate 135. A valve piston 84 is slidably fitted in the valve bore and is urged toward its fully open position at the right by a spring 85 in a chamber of the valve bore which is shown as connected with the atmosphere but which may be connected with the fluid reservoir or the inlet portion of the vane pump's fluid circuit. The valve piston is formed with an annular groove 86 connected by radial holes 87 with the axial passage 88 extending from the groove 86 to the right hand end of the valve piston. The valve bore is closed on its right hand end by a suitably attached cover 89 which is connected with the discharge conduit 63 leading to the vane slot port 38 and to the hole at the center of the modified cheek plate 135.

With this arrangement the force exerted on the valve piston 84 by the spring 85 is opposed by the action of the pressure fluid in the right hand end of the valve bore. The valve piston 84 is thus moved to permit the passage of sufficient fluid from the outlet port 37 into the right hand end of the valve bore to maintain therein a pressure determined by the spring 85. This pressure will be maintained substantially constant at the value determined by the spring 85 regardless of the pressure in the outlet port 37 except, of course, that the valve piston 84 will be moved into its fully open position whenever the pressure in the port 37 is too low to produce in the right hand end of the valve bore a pressure sufficient to overcome the force exerted by said spring. It will be noted that the movement of the valve piston 84 is otherwise independent of the pressure existing in the outlet port 37 and that the movement and position of said valve piston are determined by the spring 85 and by the pressure of the fluid in the right hand end of the valve bore. Conventional V-notches are shown on the valve piston to provide gradual fluid connection between the annular port 82 and the annular groove 86, in the well known manner.

The present invention also provides means for decreasing the friction and wear of the vanes and vane track intermediate the inlet and outlet areas, that is to say, during the portion of the rotary travel of the vanes in which the outer ends thereof are traversing the working arcs 31 and the sealing arcs 27. In all previous devices of this character of which I am aware it has been customary to introduce or admit behind the inner ends of the vanes, during this portion of their rotary travel, pressure fluid having a pressure as great or greater than the pressure in the high pressure area adjacent the outer ends of the vanes; for example, in pumps of this character it has been customary to admit pressure fluid from the high pressure port or outlet area to the inner ends of the vanes during this part of their rotary travel and in the vane type fluid motor disclosed in co-pending application filed March 28, 1938, Serial Number 198,449, the fluid admitted to the inner ends of the vanes during this part of their rotary travel has a pressure greater than but related to the pressure existing in the vane motor's high pressure port. As a result, there has been unnecessary friction and considerable wear of the working and sealing arcs in all previous rotary vane type pumps and motors of which I am aware. The present invention overcomes these and other difficulties and limitations, as will be presently explained, by admitting to the inner ends of the vanes, throughout the time that the outer ends thereof are traversing the working and sealing arcs, fluid having a pressure related to but less by a substantial amount than the pressure of the fluid in the high pressure areas of the device and sufficient in amount to keep the ends of the vanes in contact with the track surfaces of the working and sealing arcs while passing thereacross. This will be understood from a consideration of Figs. 11 and 12.

Figures 11, 11A, 12:
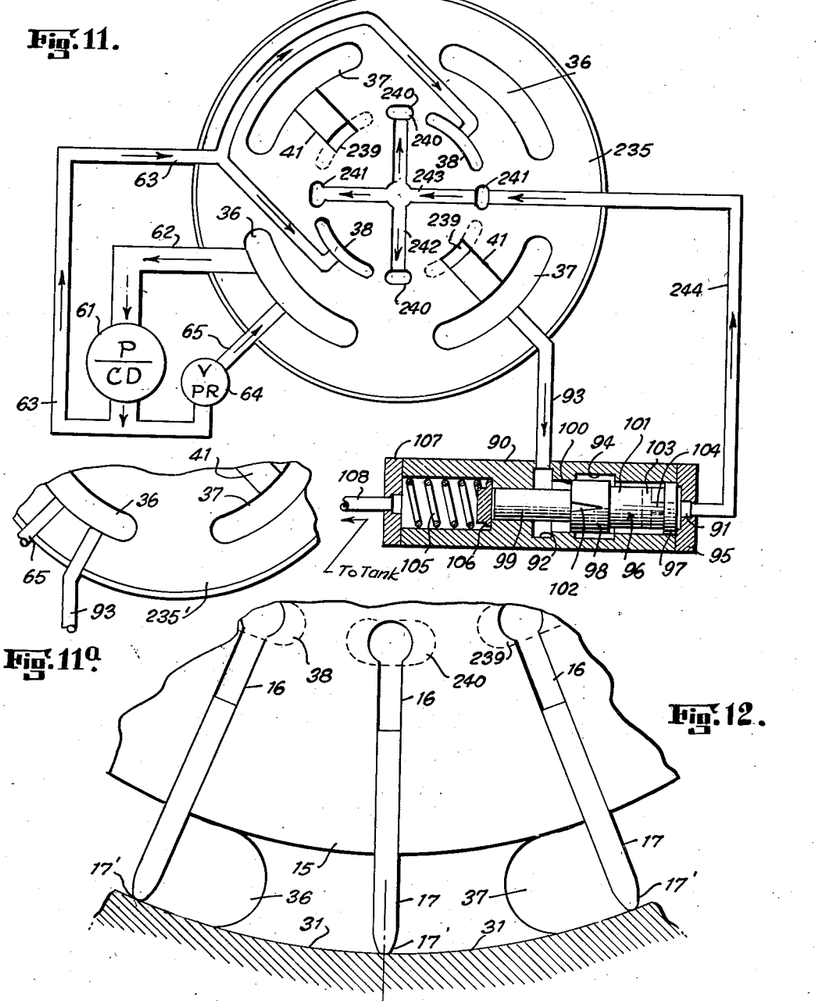
Figs. 11 and 11a illustrate, partly in section and partly in diagrammatic arrangement, a modification.
Fig. 12 is a fragmentary view, drawn to a larger scale than Figs. 1 and 2, and shows a portion of the rotor together with certain of the vanes and a portion of the vane track.

The enlarged fragmentary view of Fig. 12 shows one of the vanes 17 in contact with the working arc 31 and, in the embodiment illustrated, the vane slots 16 are in truly radial position with respect to the rotor and the outer end of each of the vanes 17 is provided with rounded contour 17' extending from the leading to the trailing faces thereof so that contact between the vane and the vane track is substantially a line contact at a point substantially midway between the leading and trailing faces of the vane. The leading face of the vane 17 is exposed to fluid having the same pressure as that in the outlet or high pressure port 37 of the pump whenever said vane is traversing the working arcs 31 and the trailing face of said vane is exposed to fluid having the same pressure as that in the inlet or low pressure port 36 which in the pump here chosen for purposes of illustration is always lower than the pressure in the outlet ports 37 and is frequently substantially zero. The two pressures in the ports 36 and 37 are thus separated by the vane 17 and each of said pressures acts upon the adjacent exposed end portion 17' of the vane 17 and tends to move said vane radially inward; thus, assuming for purposes of explanation that contact between the vane and the working arc is a perfect line contact exactly midway between the leading and trailing faces of the vane, the combined force active to move or tend to move the vane radially inward would comprise the force produced by action of high pressure fluid from the port 37 upon one-half of the cross-sectional area of the vane 17 as viewed in Fig. 12, plus the force produced by action of the low pressure fluid from the port 36 upon the other half of said cross-sectional area. The pressure of the fluid in the port 36 of the pump is, as already stated, always relatively low and usually negligible and the radially inward force produced thereby on the inner end of the vane is correspondingly small or negligible. The principal force active to tend to move the vane 17 radially inward is therefore the force produced on the exposed outer end portion 17' thereof by fluid from the high pressure port, and in many instances this will comprise substantially the total force so active. With the foregoing assumed conditions, the cross-sectional area on the outer ends of the vane exposed to high pressure fluid is one-half the area of the inner end of the vane which is exposed to pressure fluid in the inner end of the vane slot 16; neglecting the radially inward force produced by fluid under the same pressure as that in the inlet or low pressure port 36, it is thus seen that balance of hydraulic forces acting radially on the vane 17 while in contact with the working arc 31 would be produced by a pressure in the inner end of the vane slot 16 that is one-half the pressure existing in the high pressure port 37 and that the outer end of the vane 17 would be held in contact with the working arc 31 by a fluid pressure in the inner end of the corresponding vane slot 16 that is only slightly more than one-half of the pressure existing in the high pressure port 37. This would hold true during the entire time that each vane 17 is traversing each working arc 31 and also during the entire time said vane 17 is traversing each sealing arc 27. The same principle would also hold true, but to differing degrees, if the pressure in the pump's inlet ports 36 is a substantial pressure, or if the contact between the vane and the vane track is not a perfect line contact, or were not positioned exactly midway between the leading and trailing faces of the vane, or if the vane slots were not in truly radial position with respect to the rotor but the arrangement as described is preferred because it provides the same relation between the outer end of the vane and the vane track at both the working arcs 31 and the sealing arcs 27.

From the foregoing it will be seen that the customary practice of admitting or supplying high pressure fluid from the high pressure port to the inner ends of the vanes during the time that the outer ends thereof are traversing the working and sealing arcs produces an unnecessarily great radially outward force on the vanes, causing unnecessary friction and wear on said working and sealing arcs and on the outer ends of said vanes. According to the present invention, and as previously stated, this difficulty is overcome by supplying to the inner ends of the vanes during this part of their rotary travel fluid having a pressure less than but related to the pressure existing in the high pressure port, and for convenience the pressure less than but related to the pressure in the high pressure port will be termed the "fractional pressure." The amount or proportion of the fractional pressure relative to the pressure in the high pressure port will depend in part upon the particular arrangement and features of construction employed, such, for example, as the pressure of the fluid in the low pressure ports, the position of the vane slots in the rotor relative to a truly radial position thereof, the type of contact between the vane and the working and sealing arcs (i. e. line contact, area contact, etc.) and the location of the line or area of this contact on the outer ends of the vanes relative to the leading and trailing faces thereof; in the example given in the foregoing explanation and illustrated in Fig. 12, the fractional pressure theoretically need be but slightly greater than one-half the pressure existing in the high pressure port, but in practice it has usually been found desirable to employ a somewhat greater fractional pressure, such, for example, as a fractional pressure that is from two-thirds to eighty-five per cent of the pressure existing in the high pressure port when the pressure of the fluid in the low pressure ports is negligible, as in the pump of the present illustrative embodiment.

The schematic arrangement of Fig. 11 illustrates simple and novel means for obtaining the fractional pressure and for supplying it to the inner ends of the vanes 17 while the outer ends thereof are traversing the working arcs 31 and sealing arcs 27. In this instance the cheek plate 235 is modified to provide four pairs of vane slot ports 38, 239, 240 and 241 respectively, the ports of each pair being diametrically opposite one another. The vane slot ports 38 of the cheek plate 235 and the means by which they are supplied with fluid are the same as in the embodiment illustrated in Figs. 1 to 9, although it will be understood that other means may be employed for supplying fluid to said vane slot ports 38, such, for example, as the arrangement illustrated in Fig. 10 or by appropriately connecting them with the inlet ports 36 when the centrifugal force method is employed.

The vane slot ports 239 are adapted to register with the inner ends of the vane slots 16 throughout the time that the outer ends of the corresponding vanes 17 therein are moving through the outlet areas connected with the outlet ports 37. A radial groove or passage 41 on the outer face of the cheek plate 235 connects each vane slot port 239 with its corresponding outlet port 37 so that the pressure of the fluid acting on the inner ends of the vanes is the same as that acting on the outer ends thereof during the time that they are passing through the outlet areas, thus substantially effecting balance of hydraulic forces acting radially on said vanes.

The two pairs of vane slot ports 240 and 241 are adapted to connect with the inner ends of the vane slots 16 throughout the time that the outer ends of the corresponding vanes 17 therein are traversing the working arcs 31 and the sealing arcs 27 respectively. All four of the vane slot ports 240 and 241 are connected, as by schematically illustrated passages 242 and 243, with a common source of fractional pressure fluid, here shown as a passage 244 leading to and connecting with the outlet port 91 of a valve mechanism which for convenience is termed a "fractional pressure valve."

The fractional pressure valve includes a valve housing 90 having a valve bore provided with an annular inlet port 92 which is connected as by a passage 93 with one of the high pressure ports 37 of the modified cheek plate 235. The valve bore is also provided with an annular port 94 axially spaced from the inlet port 92 and the open end of said valve bore is appropriately closed as by a cover 95 having therein the outlet port 91 to which the passage 244 is connected. Slidably fitted in the valve bore is a valve piston 96 having two heads 97 and 98 respectively and also having a reduced end portion 99 slidably fitted in the correspondingly reduced portion of the valve bore. With this arrangement as described up to this point, pressure fluid from the inlet port 92 exerts a force upon the shoulder 100 formed by the juncture of the end portion 99 and the head 98, this force tending to move the valve piston 96 toward its fully open position at the right in which it is shown in Fig. 11. Fluid from the inlet port 92 passes through the V-notches 102 on the head 98, into the annular port 94, around the valve piston's reduced portion 101, through the radial passage 103 and the connected axial passage 104 into the portion of the valve bore adjacent the cover 95 and outlet port 91; the passages 103 and 104 in the valve piston 96 are indicated by dotted lines in Fig. 11. Pressure is thus built up in the end of the valve bore adjacent the cover 95 and acts upon the adjacent end of the valve piston's head 97, thereby exerting on said valve piston 96 a force opposing the force exerted thereon by action of the pressure fluid on the shoulder 100. The valve piston is thus subjected to opposing forces and, as described up to this point, said valve piston 96 moves responsive to variation in the relative magnitude of said forces to establish between the V-notches 102 and the port 104 a connection such that said opposing forces balance; that is to say, the valve piston 96 moves to provide the proper resistance to flow through the V-notches 102 to produce a lower pressure in the end of the valve bore that will exert a force on the end of the head 97 which equals the force exerted on the smaller area of the shoulder 100 by the higher pressure fluid in the inlet port 92. In this manner the pressure in the outlet port 91 would at all times be maintained at an amount less than but related to the pressure in the inlet port 92, the relation between these pressures being inversely proportional to the areas of the head 97 and the shoulder 100. With this arrangement the vane slot ports 240 and 241 are at all times supplied with fluid having a pressure less than that of the high pressure fluid in the high pressure ports 37 but of a pressure value producing a force on the inner ends of the vanes that is greater than the combined opposing forces produced by action of the pressure fluid on the outer ends of said vanes while the inner ends of said vanes are connected with one of the vane slot ports 240 or 241 as the outer ends of said vanes move across the working arcs 31 and sealing arcs 27.

I prefer, however, to supplement the hydraulically imposed force active to move the valve piston 96 toward its fully open position by the force exerted by a spring 105, one end of which bears against cover 107 and the other end of which bears against an abutment piece 106 intermediate said spring 105 and the adjacent end of the valve piston 96. By use of the spring 105 the valve piston 96 is kept at its fully open position whenever relatively low pressures exist in the port 37, thus providing full pressure behind the inner ends of the vanes 17 and assuring ample radially outward force on said vanes to provide satisfactory sealing contact between the outer ends thereof and the working and sealing arcs at these relatively low pressures; the resulting friction and wear on the working and sealing arcs at these low pressures are very small and will be negligible in most instances. When the spring 105 is employed, the pressure maintained in the outlet port 91 of the fractional pressure valve is thus the same as the pressure existing in the inlet port 92 of said fractional pressure valve and in the high pressure port 37 throughout a range of relatively low pressures in said high pressure port 37 but upon increase in the pressure in said high pressure port 37 beyond such relatively low pressure range, the pressure in the fractional pressure valve's outlet port 91 will bear a relation to the pressure in its inlet port 92 that is inversely proportional to the area of the head 97 to the area of the shoulder 100 plus an amount equivalent to the force exerted by the spring 105. For example, if the spring 105 exerts a force on the valve piston 96 equivalent to a pressure of 50 lbs. per sq. in. acting on the end of the head 97 and if the area of the shoulder 100 is two-thirds the area of the end of the head 97, the valve piston 96 would remain in its fully open position and the pressure in the outlet port 91 would be the same as in the inlet port 92 until the pressure in said inlet port reached approximately 150 lbs. per sq. in., and at higher pressures in the inlet port 92 the valve piston would move to maintain the pressure in the outlet port 93 at an amount equal to two-thirds of the pressure in said inlet port 92 plus 50 lbs. per sq. in. In order to prevent building up of pressure in the spring chamber, the cover 107 is provided with an exhaust connection 108 which may lead to the reservoir or tank. The head 97 serves principally as a guide and support for the end of the valve piston 96 and may be omitted by modifying said valve piston 96 to provide suitable guiding surfaces extending from the head 98 in the well known manner.

With this arrangement the pressure of the fluid supplied to the inner ends of the vanes 17 while the outer ends thereof are traversing the working arcs 31 and sealing arcs 27 is the same as the pressure in the high pressure port 37 at relatively low working pressures but at higher working pressures the inner ends of the vanes 17 are supplied, during this part of their rotary travel, with fluid having a pressure less than but related to the pressure existing in the high pressure ports 37. As already stated the amount of the fractional pressure relative to the pressure existing in the high pressure ports 37 will vary with individual cases but is preferably made the lowest or smallest part of said pressure in said high pressure ports 37 that will maintain satisfactory sealing contact between the outer ends of the vanes and the working and sealing arcs. Friction and wear are thus reduced to a minimum.

A further advantage of this arrangement is that it removes one of the factors heretofore limiting the maximum rotative speed at which devices of this character may be satisfactorily operated. In previous structures of this class in which full pressure from the high pressure port has been supplied to the inner ends of the vanes while the outer ends thereof are traversing the working and sealing arcs, the wear and friction at the working and sealing arcs has been so material that the maximum speed at which they could be satisfactorily operated has been limited by the maximum practical rubbing speed of the vanes against these portions of the vane track as the wear and friction increase with increase of this rubbing speed; wear and friction at other parts of the vane track have not proved serious because, while traversing these other portions of the vane track, the vanes are either balanced with respect to hydraulic forces acting radially thereon or subject to only a small radially outward force in preferred arrangements. The reduced rubbing friction on the working and sealing arcs and on the outer ends of the vanes resulting from the use of fractional pressure permits the use of higher rotative speeds of the rotor without adverse effects on these parts, in much the same manner that the rotative speed of an anti-friction bearing may be increased with decrease in the load carried thereby.

In connection with the functioning of the fractional pressure valve, it should be noted that only a small volume of fluid need pass therethrough to meet the requirements of the inner ends of the vanes 17 while the outer ends thereof are traversing the working and sealing arcs. This required volume is only the amount to make up for the fluid leaking out of the vane slot ports 240 and 241 or leaking past the vanes 17 in the slots 16, as otherwise there is no flow of fluid into or out of said vane slot ports 240 and 241.

Certain features of the present invention may be employed in vane type fluid pressure devices of the character illustrated when used as fluid motors operated by pressure fluid supplied thereto as well as when used as pumps. For example, the general arrangement illustrated in Fig. 11 will provide satisfactory operation in a vane type fluid pressure device employed as a pump and will also provide satisfactory operation in a vane type fluid pressure device operated as a motor by merely changing the passage 93, which leads to the inlet port 92 of the fractional pressure valve, to connect with the inlet port 36 instead of the outlet port 37.

This will be understood from the fragmentary view of Fig. 11a in which the passage 93 is connected with the inlet port 36 of the modified cheek plate 235'; all other parts of the arrangement are the same as shown in Fig. 11. The reason for this change in the connection of the passage 93 is that it must be connected with the high pressure port or fluid area of the device, and in a vane type pump the inlet area is the low pressure area and its outlet area is the high pressure area whereas in a vane type fluid motor the pressure relation of these areas is reversed, the inlet area of the vane type motor being its high pressure area and the outlet area thereof being its low pressure area. The term "fluid pressure device" in the appended claims is therefore intended to include both vane type pumps and vane type fluid motors.

It will be understood that the embodiments of the invention described herein are merely for purposes of illustration and that changes may be made without departing from the spirit of the invention, the scope of which is defined in the appended claims.

I claim:

1. In a rotary vane type pump having a rotor provided with a plurality of vanes movable inward and outward thereof, a casing therefor including a track for guiding the vanes in their in and out movement and provided with fluid inlet and outlet chambers adjacent the rotor whereby the outer ends of said vanes are subjected to the respective pressures of the fluid in said chambers as they pass therethrough, and means for supplying to the inner ends of said vanes an auxiliary force to urge said vanes into contact with said vane track independent of centrifugal force as they pass through said inlet chamber, said auxiliary force being substantially constant irrespective of the pressure of the fluid in said outlet chamber and acting on the inner ends of said vanes during only the portion of their rotary travel in which the outer ends of said vanes are passing through said inlet chamber.

2. In a rotary vane type pump having a rotor provided with a plurality of vanes movable inward and outward thereof, a casing therefor including a track for guiding the vanes in their in and out movement and provided with fluid inlet and outlet chambers adjacent the rotor whereby the outer ends of said vanes are subjected to the respective pressures of the fluid in said chambers as they pass therethrough, and means for supplying to the inner ends of the vanes during only the time that the outer ends thereof are passing through said inlet chamber fluid having a pressure that exceeds by a substantially constant amount the pressure of the fluid in said inlet chamber to thereby urge said vanes into contact with said vane track independent of centrifugal force.

3. In a rotary vane-type pump, a rotor having a plurality of vanes movable inward and outward thereof in a substantially radial direction, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said areas while passing therethrough, an inlet port for said inlet area, an outlet port for said outlet area, and means for supplying to the inner end of each vane during only the time that both the leading and trailing faces on the outer end thereof are in fluid connection with said inlet port fluid under relatively low pressure greater than the pressure of the fluid in said inlet area but other than the pressure of the fluid in said outlet area, to thereby urge said vanes radially outward and into contact with said vane track.

4. In a rotary vane-type pump, a rotor having a plurality of vanes movable inward and outward thereof in a substantially radial direction, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said chamber and said areas while passing therethrough, a fluid inlet conduit connected with said inlet area and arranged to provide substantially uniform pressure of the fluid therein throughout the entire length thereof, means for supplying to the inner ends of said vanes fluid under the same pressure as the fluid in said outlet area throughout the time that the outer ends of said vanes are passing through said pumping chamber and said outlet area, and means for supplying to the inner ends of said vanes while the outer ends thereof are passing through said inlet area fluid under relatively low pressure greater than the pressure of the fluid in said inlet area but different from the pressure in said outlet area, to thereby urge said vanes radially outward into contact with said vane track independent of but supplementary to the force exerted upon said vanes by centrifugal action.

5. In a rotary vane-type pump, a rotor having a plurality of vanes movable inward and outward thereof in a substantially radial direction, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said areas while passing therethrough, and means for supplying to the inner ends of said vanes while the outer ends thereof are passing through the inlet area fluid under relatively low pressure greater than the pressure of the fluid in said inlet area, to thereby urge said vanes radially outward and into contact with said vane track, said means comprising a fluid supply port adapted to register with the inner ends of said vanes while the outer ends thereof are passing through said inlet area, an auxiliary pump having a discharge conduit, fluid connection between said discharge conduit and said supply port for supplying thereto fluid delivered by said auxiliary pump, and valve means for regulating the pressure of the fluid in said discharge conduit.

6. In a rotary vane-type pump, a rotor having a plurality of vanes movable inward and outward thereof in a substantially radial direction, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said areas while passing therethrough, and means for supplying to the inner ends of said vanes while the outer ends thereof are passing through the inlet area fluid under relatively low pressure greater than the pressure of the fluid in said inlet area but other than the pressure of the fluid in said outlet area, to thereby urge said vanes radially outward and into contact with said vane track, said means comprising a fluid supply port adapted to register with the inner ends of said vanes while the outer ends thereof are passing through said inlet area, a fluid outlet conduit leading from said outlet area, a fluid supply conduit leading to said supply port and connectible to varying degrees with said outlet conduit, and valve means intermediate said outlet and supply conduits active to vary the extent of connection between said conduits responsive to pressure in said supply conduit to thereby maintain in said supply conduit a pressure lower than but otherwise independent of the pressure in said outlet area.

7. In a rotary vane-type pump, a rotor having a plurality of vanes movable inwardly and outwardly thereof in a substantially radial direction, a casing therefor including a vane track for guiding said vanes in their in and out movement and provided with a pumping chamber having inlet and outlet areas on opposite circumferential sides thereof adjacent the rotor, a revoluble shaft having operative connection with said rotor, and means for supplying to the inner ends of said vanes while the outer ends thereof are passing through said inlet area fluid under relatively low pressure greater than the pressure of the fluid in said inlet area to thereby urge said vanes outward into contact with said vane track, said means comprising a fluid supply port adapted to register with the inner ends of said vanes while the outer ends thereof are passing through said inlet area, an auxiliary pump operatively connected with said shaft to be driven thereby, said auxiliary pump having a fluid supply connection with said inlet area and also having a fluid discharge conduit, fluid connection between said discharge conduit and said supply port for supplying thereto fluid delivered by said auxiliary pump, and valve means for regulating the pressure of the fluid in said discharge conduit.

8. In a rotary vane type pump having at least one fluid section, said fluid section including a working chamber having inlet and outlet areas on opposite circumferential sides thereof, a rotor having a plurality of vanes movable inward and outward thereof in a substantially radial direction, the outer ends of said vanes being subject to the respective pressures in said chamber and in said areas while passing therethrough, a fluid supply conduit connected with said inlet area but without direct connection with the inner ends of said vanes, a vane track adapted to contact the outer ends of said vanes and to guide them in their in and out movement, means for supplying to the inner end of each vane during only the portion of its rotary travel through the fluid section in which the outer end thereof is passing through the inlet area fluid having a pressure greater than but related to the pressure of the fluid in said inlet area but independent of the pressure of the fluid in said outlet area and means for supplying to the inner end of each vane during substantially the remainder of its rotary travel through the fluid section fluid having pressure dependent upon the pressure of the fluid in said outlet area.

9. In a rotary vane type fluid pressure device, a rotor having a plurality of vanes movable inward and outward thereof in a substantially radial direction, a casing therefor including a vane track having inlet and outlet areas adjacent the rotor, the outer ends of said vanes being subject to the pressure in said inlet area while passing therethrough, and means for supplying to the inner ends of said vanes during only the portion of their rotary travel in which the outer ends thereof are passing through said inlet area fluid having a pressure greater than but related to the pressure of the fluid in said inlet area to thereby urge said vanes into contact with said vane track independent of centrifugal force.

10. In a rotary vane type fluid pressure device having a rotor provided with a plurality of vanes movable inward and outward thereof, a vane track adapted to contact the outer ends of said vanes including a working arc and a sealing arc, said working and sealing arcs each having high pressure and low pressure areas on opposite circumferential sides thereof, and means for supplying to the inner ends of the vanes during the time that the outer ends thereof are traversing said working and sealing arcs fluid having a pressure less than the pressure of the fluid in said high pressure area but sufficient to maintain the outer ends of said vanes in contact with said working and sealing arcs as they pass thereacross, with the difference in pressure increasing as the pressure in said high pressure area increases.

11. In a rotary vane type fluid pressure device having a rotor provided with a plurality of vanes movable inward and outward thereof in a substantially radial direction, a vane track adapted to contact the outer ends of said vanes including a working arc and a sealing arc, said working and sealing arcs each having high pressure and low pressure areas on opposite circumferential sides thereof, and means for supplying to the inner ends of the vanes during the time that the outer ends thereof are traversing said working and sealing arcs fluid having a pressure less by a substantial amount than but having a predetermined relation to the pressure of the fluid in said high pressure area, including pressure control means active to regulate the pressure of the fluid supplied to the inner ends of said vanes during the time that the outer ends thereof are traversing said working and sealing arcs.

12. In a rotary vane type fluid pressure device having a rotor provided with a plurality of vanes movable inward and outward thereof in a substantially radial direction, a vane track adapted to contact the outer ends of said vanes including a working arc and a sealing arc, said working and sealing arcs each having high pressure and low pressure areas on opposite circumferential sides thereof, and means active to supply to the inner ends of said vanes during the time that the outer ends thereof are traversing said working and sealing arcs fluid having the same pressure as that in said high pressure area throughout a limited range of pressures in said high pressure chamber and to supply to the inner ends of said vanes fluid having a pressure less than but related to the pressure of the fluid in said high pressure area when said pressure in said high pressure area exceeds said limited range of pressures.

13. In a rotary vane type fluid pressure device having a rotor provided with a plurality of vanes movable inward and outward thereof in a substantially radial direction, a vane track adapted to contact the outer ends of said vanes including a working arc and a sealing arc, said working and sealing arcs each having high pressure and low pressure areas on opposite circumferential sides thereof, and means for supplying pressure fluid to the inner ends of the vanes during the time that the outer ends thereof are traversing said working and sealing arcs and throughout the entire range of pressures existing in said high pressure area, the pressure of the fluid supplied to the inner ends of said vanes being related to the pressure existing in said high pressure area and being less by a nonconstant amount than the pressure in said high pressure area throughout at least a range of pressures in said high pressure area, said last named means including a supply port opposite each of said working and sealing arcs, each supply port being adapted to connect with the inner end of each vane while the outer end thereof is traversing the corresponding arc, a fluid outlet conduit leading from said high pressure area, a fluid supply conduit leading to said supply ports and connectible to varying degrees with said outlet conduit, and valve means intermediate said outlet and supply conduits active to vary the extent of connection between said conduits responsive to variation in the relative pressures in said outlet and supply conduits.

14. In a rotary vane type hydraulic pump, a rotor having a plurality of vanes movable inwardly and outwardly thereof in a substantially radial direction, a two part casing therefor including a vane track for guiding said vanes in their in and out movement and provided with a working chamber having inlet and outlet areas on opposite circumferential sides thereof adjacent the rotor, packing means intermediate said casing parts, a revoluble shaft having operative connections with said rotor, packing means for said shaft, a fluid supply port adapted to connect with the inner ends of said vanes while the outer ends thereof are passing through said inlet area, an auxiliary pump having a discharge conduit, fluid connections between said discharge conduit, said supply port and the inner side of said packing means for supplying to said supply port and to the inner side of said packing means pressure fluid delivered by said auxiliary pump, and valve means active to maintain the fluid delivered by said auxiliary pump into its discharge conduit at a relatively low pressure related to and greater than the pressure in said inlet area and greater than atmospheric pressure to thereby urge said vanes outward into contact with said vane track and to prevent the admission of air past said packing means.

15. In a rotary vane-type fluid pressure device, a rotor having a plurality of vanes movable inward and outward thereof in a substantially radial direction, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said areas while passing therethrough, and means for supplying to the inner ends of said vanes during only the time that the outer ends thereof are passing through the inlet area fluid under pressure greater than the pressure of the fluid in said inlet area, to thereby urge said vanes radially outward and into contact with said vane track, said means comprising a fluid supply port adapted to connect with the inner ends of said vanes during only the time that the outer ends thereof are passing through said inlet area, an auxiliary pump having a discharge conduit, fluid connection between said discharge conduit and said supply port for supplying thereto fluid delivered by said auxiliary pump, and means for maintaining the fluid in said discharge conduit at a pressure exceeding by a substantially constant amount the pressure of the fluid in the inlet area, irrespective of pressure changes in said inlet area.

16. In a rotary vane-type pump, a rotor having a plurality of vanes movable inwardly and outwardly thereof, a casing therefor including a vane track for guiding said vanes in their in and out movement and provided with a pumping chamber having inlet and outlet areas on opposite circumferential sides thereof adjacent the rotor, the outer ends of said vanes being subject to the pressures in said areas while passing therethrough, a fluid supply conduit connected with said inlet area, and means for supplying to the inner ends of said vanes while the outer ends thereof are passing through said inlet area fluid under pressure greater than the pressure of the fluid in said inlet area and other than the pressure of the fluid in said outlet area, to thereby urge said vanes into contact with said vane track, including means for increasing the pressure of the fluid supplied to the inner ends of the vanes above the pressure of the fluid in said fluid supply conduit.

17. In a rotary vane type fluid pressure device, a rotor having a plurality of vanes movable inwardly and outwardly thereof in a substantially radial direction, a casing therefor including a vane track for guiding said vanes in their in and out movement and provided with a fluid inlet area and a fluid outlet area adjacent the rotor, one of said areas being the low pressure area and the other of said areas being the high pressure area, the outer ends of said vanes being subject to the respective pressures in said areas while passing therethrough, an inlet port adjacent said inlet area, an outlet port adjacent said outlet area, said ports being circumferentially spaced from one another, means for supplying to the inner ends of the vanes during the time that the outer ends thereof are passing through the inlet area fluid having a pressure greater than but related to the pressure of the fluid in said inlet area and means for supplying to the inner ends of the vanes during the time that the outer ends thereof are moving circumferentially intermediate said inlet and outlet ports fluid having a pressure related to but less than the pressure of the fluid in whichever of said areas is the high pressure area and sufficient in amount to keep the outer ends of the vanes in contact with the vane track.

18. In a rotary vane type fluid pressure device, a rotor having a plurality of vanes movable inwardly and outwardly thereof, a casing therefor including a vane track for guiding said vanes in their in and out movement and provided with a fluid inlet area and a fluid outlet area adjacent the rotor, one of said areas being the low pressure area and the other of said areas being the high pressure area, the outer ends of said vanes being subject to the respective pressures in said areas while passing therethrough, an inlet port adjacent said inlet area, an outlet port adjacent said outlet area, said ports being circumferentially spaced from one another by an arcuate distance equal approximately to the angular distance between a pair of adjacent vanes, means for supplying to the inner ends of the vanes during substantially the entire time that the outer ends thereof are passing through the inlet area fluid having a pressure greater than the pressure of the fluid in said inlet area and means for supplying to the inner ends of said vanes during the time that the outer ends thereof are moving circumferentially intermediate said inlet and outlet ports fluid having a pressure related to the pressure of the fluid in the high pressure area but differing therefrom throughout at least a certain range of pressures in said high pressure area by an amount that increases with increase in pressure in said high pressure area.

19. In a rotary vane type fluid pressure device, a rotor having a plurality of vanes movable inwardly and outwardly thereof in a substantially radial direction, a casing therefor including a vane track for guiding said vanes in their in and out movement and provided with a fluid inlet area and a fluid outlet area adjacent the rotor, one of said areas being the low pressure area and the other of said areas being the high pressure area, the outer ends of said vanes being subject to the respective pressures in said areas while passing therethrough, an inlet port adjacent said inlet area, an outlet port adjacent said outlet area, said ports being circumferentially spaced from one another, means for supplying to the inner ends of the vanes during only the time that the outer ends thereof are passing through the inlet area fluid having a pressure greater than but related to the pressure of the fluid in said inlet area and means for supplying to the inner ends of the vanes during the time that the outer ends thereof are moving circumferentially intermediate said inlet and outlet ports fluid having a pressure different from the pressure supplied to the inner ends of said vanes while the outer ends are passing through said inlet area and sufficient in amount to keep the outer ends of the vanes in contact with the vane track.

20. In a rotary vane type fluid pressure device, a rotor having a plurality of vanes rotatable in unison therewith and movable inwardly and outwardly thereof, a casing therefor including a vane track for guiding the vanes in their in and out movement, a fluid inlet area and a fluid outlet area circumferentially spaced from one another, one of said areas also being the high pressure area and the outer ends of said vanes being subject to the respective pressures in said areas while passing therethrough, means for utilizing one fluid pressure at the inner end of each vane during substantially the entire portion of its rotary movement in unison with the rotor in which both faces on the outer end thereof are subject to the pressure of the fluid in the inlet area, means for utilizing another fluid pressure at the inner end of each vane during substantially the entire portion of its rotary movement in which both faces on the outer end thereof are subject to the pressure of the fluid in the outlet area and means active at all pressures in said high pressure area to supply pressure fluid to the inner end of each vane during the portion of its rotary movement in which one face on the outer end thereof is subject to the pressure of the fluid in the inlet area and the other face thereof is subject to the pressure of the fluid in the outlet area, said last named means being active upon the existence of at least certain pressures in the high pressure area to supply fluid having a pressure less than the pressure in said high pressure area with the difference between said pressures increasing upon increase in the pressure in said high pressure area.

21. In a rotary vane type fluid pressure device, a rotor having a plurality of vanes rotatable in unison therewith and movable inwardly and outwardly thereof, a casing therefor including a vane track for guiding the vanes in their in and out movement, a fluid inlet area and a fluid outlet area circumferentially spaced from one another, the outer ends of said vanes being subject to the respective pressures in said areas while passing therethrough, means for utilizing one fluid pressure at the inner end of each vane during substantially the entire portion of its rotary movement in unison with the rotor in which both faces on the outer end thereof are subject to the pressure of the fluid in the inlet area, means for utilizing another fluid pressure at the inner end of each vane during substantially the entire portion of its rotary movement in which both faces on the outer end thereof are subject to the pressure of the fluid in the outlet area and means for utilizing a third fluid pressure at the inner end of each vane during the portion of its rotary movement in which one face on the outer end thereof is subject to the pressure of the fluid in the inlet area and the other face thereof is subject to the pressure of the fluid in the outlet area, said last named fluid pressure being of a value intermediate the values of said first and second named fluid pressures utilized at the inner end of said vane and varying in an approximately proportional relation to the higher of the two pressures existing in said inlet and outlet areas respectively.

22. In a rotary vane type fluid pressure device, a vane track, a rotor having vanes the outer ends of which follow said track, the outer end of each vane having a contact area with the track which is less than the area of the inner end thereof, and means for at all times supplying to the inner end of each vane during at least a portion of its rotary movement fluid having a pressure less than the highest fluid pressure acting on any part of the outer end of the vane but of a pressure value producing a force on the inner end of the vane greater than the combined opposing forces produced by action of pressure fluid on all parts of the outer end of the vane.

23. In a rotary vane type fluid pressure device, a vane track, a rotor having vanes rotatable therewith and following the track, each vane having an end adapted to contact the track and which is partially exposed adjacent both faces of the vane to the action of pressure fluid to which said faces are simultaneously subjected, whereby said pressure fluid exerts a force upon said vane tending to move it out of contact with said track, the track-contacting end of each vane during a portion of its rotary movement in unison with the rotor being subjected to pressures of different values on the opposite faces thereof, and means for supplying to the opposite end of each vane during said portion of its rotary movement fluid having a pressure less than the higher but greater than the lower of said pressures of different values to which the faces of the track-contacting end of the vane are then exposed to thereby exert on said vane a force tending to move it into contact with said track, said last named force exceeding the combined forces acting to move the vane out of contact with the track by an amount sufficient to provide fluid-sealing contact between the vane and the track but without material excess of such amount.

24. In a rotary vane type fluid pressure device, a vane track, a rotor having vanes movable inwardly and outwardly, the ends of said vanes which contact the track being reduced in cross-section, and means for supplying to the inner ends of each vane during a part of its rotary movement fluid having a pressure lower by a non-constant substantial amount than the highest pressure of the fluid to which the outer end of the vane is then exposed but sufficient in amount to keep the ends of said vanes in contact with the track.

25. In a rotary vane type fluid pressure device, a vane track, a rotor having vanes movable inwardly and outwardly thereof, the outer ends of said vanes being alternately subjected to inlet and discharge pressures during their rotary movement in unison with the rotor, means for supplying fluid of one pressure to the inner ends of each vane during one part of its rotary movement and means for supplying fluid of another pressure to the inner end of each vane during another part of its rotary movement, both of said pressures supplied to the inner end of the vane being different from said inlet and discharge pressures.

26. In a rotary vane type fluid pressure device, a vane track, a rotor having vanes movable inwardly and outwardly thereof, the outer ends of said vanes being alternately subjected to inlet and discharge pressures during their rotary movement in unison with the rotor, means for supplying fluid of one pressure to the inner ends of each vane during the time that the outer end thereof is exposed solely to inlet pressure and means for supplying fluid of another pressure to the inner end of each vane during the time that the outer end thereof is subject to both inlet and discharge pressures, both of said pressures supplied to the inner end of the vane being different from said inlet and discharge pressures.

27. In a rotary vane type fluid pressure device, a vane track, a rotor having a plurality of vanes rotatable in unison therewith and following said track, the opposite faces on the outer end of each vane being subjected to pressures of different values during a portion of the rotary movement of the vane in unison with the rotor, and means for supplying to the inner end of the vane during said portion of its rotary movement fluid having a pressure sufficient to cause the outer end thereof to follow and contact the track but less by a non-uniform differential than the higher of the two pressures to which the faces of the outer end of the vane are then subjected throughout at least a range of pressure values of said higher pressure.

CHARLES M. KENDRICK.